(No Model.)  2 Sheets—Sheet 1.

J. H. HIGGINS.
CONVERTIBLE HARROW AND CULTIVATOR.

No. 393,108. Patented Nov. 20, 1888.

WITNESSES:
John A. Ellis
C. Sidgwick

INVENTOR:
J. H. Higgins
BY Munn & Co
ATTORNEYS.

(No Model.) 2 Sheets—Sheet 2.
J. H. HIGGINS.
CONVERTIBLE HARROW AND CULTIVATOR.
No. 393,108. Patented Nov. 20, 1888.
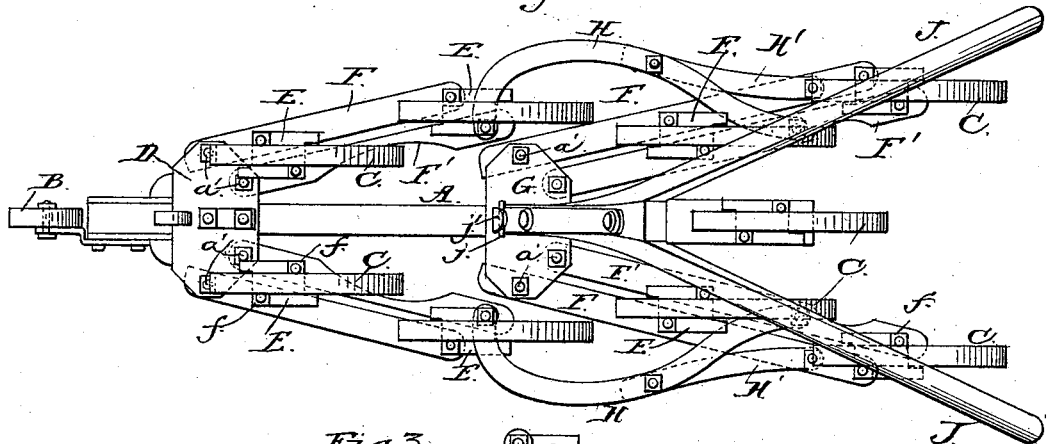
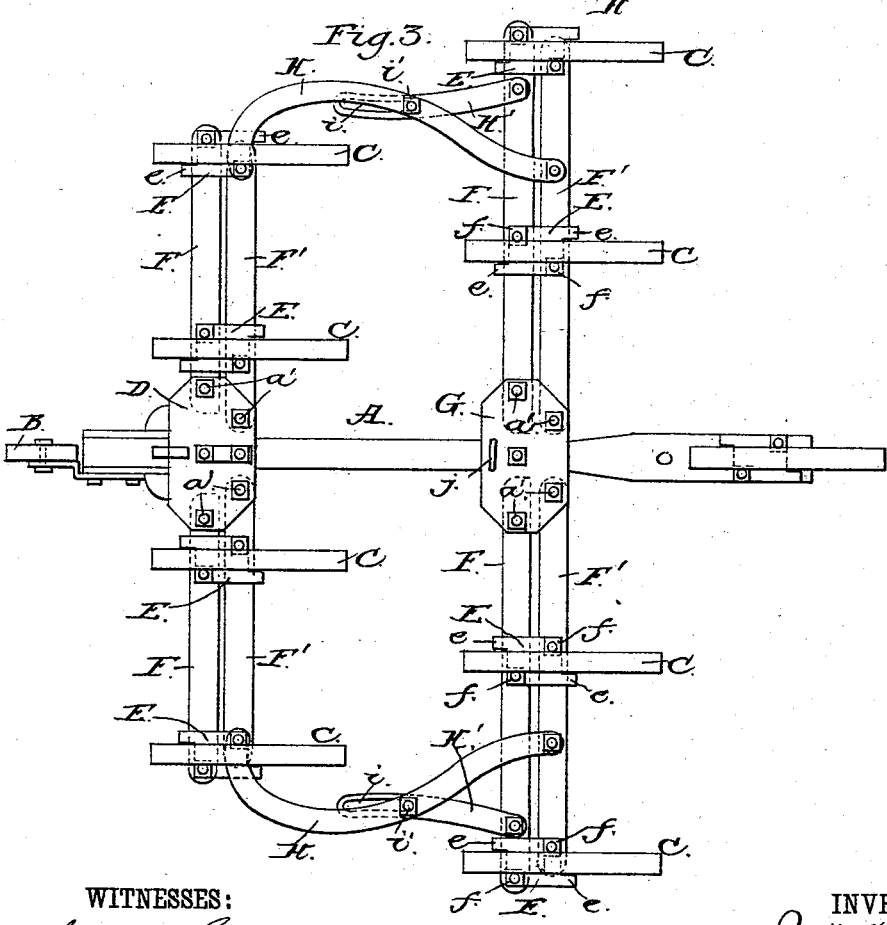
WITNESSES:
John A. Ellis
C. Sedgwick
INVENTOR:
J. H. Higgins
BY Munn & Co
ATTORNEYS.

UNITED STATES PATENT OFFICE.

JOHN H. HIGGINS, OF CHARLESTON, MAINE.

CONVERTIBLE HARROW AND CULTIVATOR.

SPECIFICATION forming part of Letters Patent No. 393,108, dated November 20, 1888.

Application filed December 7, 1887. Serial No. 257,194. (No model.)

*To all whom it may concern:*

Be it known that I, JOHN H. HIGGINS, of Charleston, in the county of Penobscot and State of Maine, have invented a new and Improved Convertible Harrow and Cultivator, of which the following is a full, clear, and exact description.

Heretofore great trouble has been encountered, in the manufacturing of spring-tooth harrows and cultivators combined, in constructing them so that the teeth would always retain the same relative position or parallelism with the line of draft, whether extended to work full or at any intermediate width or shut close enough to use between rows of corn, potatoes, &c. Usually they have been constructed (especially cultivators) by bolting the teeth to a single bar that is extended or closed by lapping the inside end across the draft-beam at right angles with the line of draft or fastened to a single side bar that is hinged to the draft-bar at any desired angle. But in all the ways so far known to me the teeth stand out at an angle with the line of draft, or when the width of the cultivator is reduced for narrow work they stand in as regards their position with the line of draft. Thus the cultivator or harrow can be used only at one particular width and have the teeth work in a direct line with the draft-point and fastening of the teeth without a constant twist on the fastening and a sidewise motion of the point.

The purpose of my invention is to entirely overcome the above objection and to furnish a device whereby the teeth always retain their parallel position with the line of draft for effective work, whether the cultivator or harrow is opened to its widest extent or closed for use in the narrowest rows of crops.

Reference is to be had to the accompanying drawings, forming a part of this specification, in which similar letters of reference indicate corresponding parts in all the figures.

Figure 1:
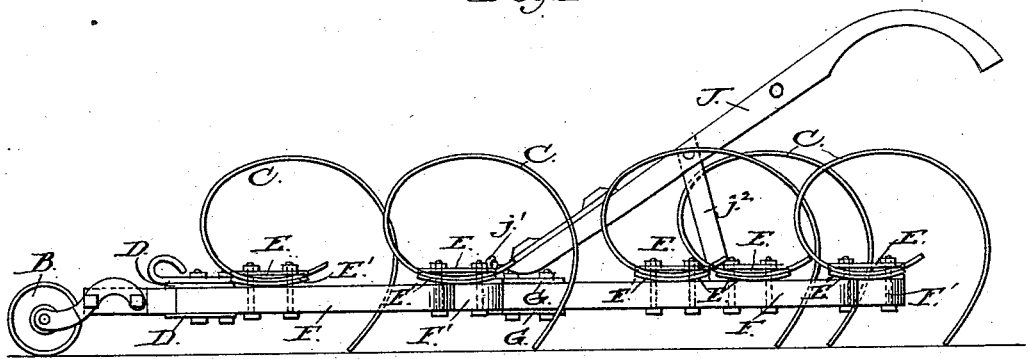
Figure 4:
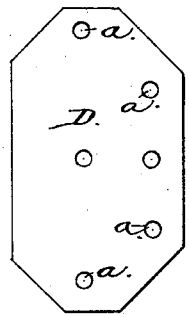
Figure 5:
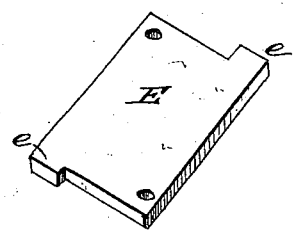

Figure 1 is a side elevation of my improved convertible cultivator and harrow provided with handles and arranged for use as a cultivator. Fig. 2 is a plan view of the same. Fig. 3 is a plan view showing the parts extended at full width for use as a harrow, and Fig. 4 is an enlarged plan view of one of the plates D. Fig. 5 is a perspective view of one of the fastening-plates.

I construct the frame of any desired material, preferably hard wood.

A is the draft bar or beam, provided at its forward end with a suitable wheel, B, to regulate the depth of penetration of the spring-teeth C C. Attached to the said draft-beam A about six inches from its front end are two metal plates D D. Said plates are securely bolted to the draft-bar at their centers, one above, the other below, the draft-bar, and the ends of the said plates projecting to each side of the draft-bar, and they are provided with two holes, *a a*, at each end, one farther from the center than the other. The position of said holes is determined by the width of the spring-teeth and the distance apart of the holes in the plates or caps E E, that fasten the teeth to the side bars F F'. Two other plates, G G, exactly like the plates D, are bolted securely to the draft-bar at a distance from the plates D that is determined by the size or curve of the spring-teeth, measuring from the point of spring to point of fastening the same. There are four bars F F' for each set of plates D G, each attached to the plates by a single bolt, *a'*, passed through the holes *a* in the plates, so that the bars F' are pivoted in the rear of and nearer to the draft-bar A than are the front bars F.

The spring-teeth C are attached to the harrow by fastening devices which span the space between the bars F F', and which are pivoted to both bars by bolts *f f*, which have the same relation to each other that the pivots or bolts *a'* of the two bars F F' have to each other, so that in the swinging out or in of the bars F F' to increase or contract the width of the cultivator the spring-teeth will be carried upon a support always parallel with the central draft-bar, A. In this manner, no matter what position the bars F F' may occupy relatively to the bar, A, whether at right angles thereto, as in Fig. 3, or as close to the bars A as it is possible to swing them, as in Fig. 2, or at any intermediate point, the teeth C will always be held parallel with the draft-bar.

The fastening device for the teeth C consists in this instance of a bottom plate, E', of thin stiff metal, to form a seat or support across the space between the bars and the above-mentioned cap-plate E. The bolts *f* are passed through these plates at opposite inner and outer corners in position to correspond with the bolts $a'$, and one at each edge of the tooth. The opposite corners of the cap-plates E are formed with projections $e$ to engage and hold the opposite edges of the tooth. The bolts $f$ therefore prevent the tooth from canting in one direction, while the said projections $e$ prevent it from canting in the opposite direction.

In order that the front and rear sets of bars F F' may move together when turned to adjust the width, I connect the two bars F' F' together by a curved plate, H, and the bars F in the rear sets are connected by the plates H' to the plates H, as shown clearly in Fig. 3, the plates H' being slotted, as shown at $i$, to slide upon the bolts $i'$, by which they are connected to the plates H.

The upper plate, G, is provided with a fastening device or loop, $j$, to receive a fastening device or hook, $j'$, at the front end of the handles J, which may be easily attached or detached, according as to whether required or not; and said handles are provided with a brace, $j^2$, which rests upon and is secured to the draft-bar A, as shown in Fig. 3, by a suitable bolt, so that the handles have a firm and secure attachment when put in place for use.

Having thus described my invention, what I claim as new, and desire to secure by Letters Patent, is—

1. The draft-bar A, having the bars F F' pivoted at its sides, the bars F being pivoted in front of and farther away from the draft-bar than the bars F', substantially as described.

2. The draft-bar A and the sets of pivoted side bars F F' at front and rear, in combination with the connecting-plates H and H', substantially as described.

3. The fastening plate E, formed with the projections $e$ $e$ at opposite diagonal corners and with holes to receive the fastening-bolts, the projections $e$ $e$ being in the same plane with the body of the fastening-plate, substantially as described.

JOHN H. HIGGINS.

Witnesses:
 WILLIS E. PARSONS,
 CHARLES W. HAYES.